(12) United States Patent
Xu

(10) Patent No.: US 6,834,577 B2
(45) Date of Patent: Dec. 28, 2004

(54) AUTOMATIC FRY APPARATUS

(76) Inventor: Zhaoxia Xu, 4694 Sycamore Dr., Ypsilanti, MI (US) 48197

( * ) Notice: Subject to any disclaimer, the term of this patent is extended or adjusted under 35 U.S.C. 154(b) by 0 days.

(21) Appl. No.: 10/249,399

(22) Filed: Apr. 5, 2003

(65) Prior Publication Data

US 2004/0194635 A1 Oct. 7, 2004

(51) Int. Cl.[7] .............................. A47J 37/12; A47J 37/10
(52) U.S. Cl. ............................. 99/409; 99/407; 99/427
(58) Field of Search ......................... 99/409, 407, 404, 99/403, 427, 476

(56) References Cited

U.S. PATENT DOCUMENTS

| | | | | |
|---|---|---|---|---|
| 4,873,920 A | * | 10/1989 | Yang | ................. 99/409 |
| 5,027,697 A | | 7/1991 | De Longhi | |
| 5,134,927 A | * | 8/1992 | McCarthy et al. | ............ 99/427 |
| 5,417,148 A | * | 5/1995 | Cavallo | ................. 99/334 |
| 5,543,166 A | * | 8/1996 | Masel et al. | ............... 426/523 |
| 5,611,265 A | | 3/1997 | Ronci | |
| 6,079,319 A | * | 6/2000 | Doria | ................. 99/331 |
| 6,365,878 B1 | | 4/2002 | Lau | |
| 6,453,801 B1 | * | 9/2002 | Masel et al. | ................. 99/330 |
| 6,546,848 B2 | * | 4/2003 | Ehlhardt et al. | ............ 99/403 |

* cited by examiner

Primary Examiner—Reginald L. Alexander

(57) ABSTRACT

An automatic fry apparatus. This fry apparatus includes a container (100) having an open top and a closed bottom for holding and heating oil, a lid (102) for covering container (100), a perforated rotary drum (104) defining therewithin a frying chamber for foods removably installed in container (100), a motor (106) operationally connected to drum (104) through a transmission assembly (108) for rotating drum (104), and a forced venting system, which includes a blowing device (200) and a venting device (202) for blowing fresh air into the fry apparatus such that the evaporation of food moisture is facilitated and the oil vapor content and odors in the cooking fumes are removed before the air is exhausted into the room. Drum (104) is partially immersed in the boiling oil for frying foods. When drum (104) rotates, the food pieces therein are automatically separated and stirred for a homogeneous heating. A control module (166) controls the whole frying process in a programmed automatic manner, and therefore human involvement and chore are minimized.

19 Claims, 12 Drawing Sheets

AUTOMATIC FRY APPARATUS

BACKGROUND OF INVENTION

This invention generally relates to cooking/food processing apparatuses. More specifically, this invention relates to automatic fry apparatuses.

Fried foods, such as fried shrimp, fried fish, fried chicken, etc., are tasteful. Two of the most important characteristics of fried foods are: outside, golden and crispy; and inside, juicy and tender. There are some issues associated with preparing fried foods at home.

First, the contact of moisture-containing raw foods with hot oil produces grease splattering. Most times, the splattering liquids and food particles reach out of fry apparatuses to considerable distances. These will not only mess up stovetops and surrounding surfaces but also create undue oil burn injuries to the people who are preparing fried foods. The problem of grease fires in the kitchen as well as severe oil burns to people has been well documented.

Second, oil vapor is produced when oil is heated. The people who are preparing fried foods involuntarily inhale considerable amount of cooking fumes during the cooking process. Oil vapor is harmful to human health and might pose long-term health threats to the people who expose themselves to oil vapor on a very regular base.

Third, the oil vapor generated in the cooking process might easily reach much farther in the kitchen or even other rooms and deposit on the furniture, paintings, electrical appliances, etc., thereby causing long-term hazards to home environment.

Fourth, on the other hand, there is an ever-increasing concern over the amount of oil or fat in one's diet for general public. In particular, a low fat diet is desirable in light of the related health concerns. Generally, fried foods contain more fat than other foods.

Many products of deep-frying apparatuses or food processing apparatuses are on the market, including the electric frying apparatus taught by U.S. Pat. No. 6,365,878, issued to Lau, on Apr. 2, 2002. These products are equipped with vertically moving baskets only and generally require the food to be immersed deep in the frying oil; which means that large quantity of oil is required. The high quantity of oil needed for proper cooking also means high operating cost due to high power consumption and longer time for cooking. The quantity of oil absorption by the food is prohibitively high, as well.

The disposal of used oil is going to be an environmental issue. Food processing businesses or restaurants might be able to afford expensive equipment for the disposal or treatment of used oil. But general public will find it difficult in dealing with large quantity of used oil.

Another issue is that the user has to repeatedly stir or turn the food around to separate the food pieces during frying, such that the food can be cooked more uniformly.

Over years, various devices have been developed to address these problems associated with frying at home.

U.S. patent application Ser. No. 10/249,240, filed by myself, on Mar. 25, 2003, teaches a forced venting fry utensil. The fry utensil comprises a container for holding and frying foods, a lid covering on the top of the container, a blowing device for blowing fresh air into the fry utensil for facilitating the evaporation of food moisture, and a venting device for filtering and deodorizing the cooking fumes.

The aforementioned prior art is concentrating on the issue of the splattering of hot grease and food particles and cooking fumes treatment. However, It fails to address the necessity of automating the frying process. Without frying process automation, especially at home, consumers have to stir the food or turn the food over in the middle of frying processes. In this case, the generation of hot oil splattering and the escape of oil vapor into the room are still inevitable.

Some patents have been granted in the area of automatic frying apparatuses.

U.S. Pat. No. 5,027,697, issued to De Longhi, on Jul. 2, 1991, teaches a-rotating oblique basket fryer for cyclic immersion cooking; which facilitates the elimination of moisture in the food, accelerates the heat exchange process, and favors uniform operating temperatures.

U.S. Pat. No. 5,543,166, issued to Masel, et al., on Aug. 6, 1996, describes a cooking appliance including a drum for receiving the food articles to be cooked. The appliance is characterized in that the finished food is spun about a central axis to spin out unwanted excess of oil.

U.S. Pat. No. 5,611,265, issued to Ronci et al., on Mar. 18, 1997, describes a combination of fryer and charbroiler food cooking apparatus. The excessive oil is separated from the fried foods by using a centrifugal means.

U.S. Pat. No. 6,453,801, issued to Masel, et al., on Sep. 24, 2002, teaches a cooking appliance and method for cooking food articles by means of a rotary drum. The appliance is characterized in that a liquid container is selectively movable to a raised or lowered position to adjust the oil level with respect to the food articles.

The aforementioned prior arts are concentrating on automatic frying apparatuses with special emphasis on the low fat frying. The low fat characteristic is mostly achieved by mechanical means, that's centrifugal means. This makes the prior art apparatuses less appealing because the mechanical separation device generally requires a large size of the frying apparatus. The manufacturing cost is higher and consequently the higher prices the general public pays to buy these apparatuses. Another reason why these prior art apparatuses do not prevail lies on the fact that the mechanisms for achieving targeted objectives are, to some extent, too complicated, which, again, drives up the manufacturing cost. The effort spent on cleaning these apparatuses after use is another important factor. In addition, they fail to address the issue of cooking fumes hazards.

Low fat frying can be, alternatively, achieved by means of how the food is processed. The key point is that the moisture content residing in the raw food, especially in the surfaces of food pieces, has to be removed as quickly as possible. The removal of the surface moisture content greatly favors less fat absorption, less time and energy consumption for frying, and foods of great looking and taste.

Therefore, it remains desirable to provide fry apparatuses that can be used to prepare tasteful fried foods, that are automatic to minimize the human involvement or chore during the frying process, that favors homogeneous heating of foods, that require minimal quantity of oil for frying foods, that can effectively and efficiently evaporate the surface moisture content of food pieces to achieve the characteristic of low fat absorption, great looking and taste of foods, that are inexpensive to manufacture and simple and easy to use, and also that are environment, people, and home friendly.

SUMMARY OF INVENTION

Accordingly, the present invention is an automatic fry apparatus. This fry apparatus comprises a container for holding and heating oil, a lid for covering the container, a perforated rotary drum removably installed inside the container for holding and frying foods, a motor operationally coupled with the rotary drum through a transmission assembly for rotating the drum, a blowing device for blowing fresh air into the fry apparatus to facilitate the evaporation of the moisture content residing in the surfaces of food pieces, and a venting device for filtering and deodorizing the cooking fumes.

The rotary drum is partially immersed in the boiling oil, and therefore, less oil is required for frying foods. When the drum rotates, the food pieces therein are automatically separated and stirred, thereby facilitating homogeneous heating. The frying process is fully automatic and requires minimal human involvement and chore.

Accordingly, the followings are some of the objects, features, and advantages of the present invention:

It is an object of the present invention to provide a fry apparatus for use to prepare tasteful fried foods.

It is another object of the present invention to provide a fry apparatus that are automatic to minimize the human involvement or chore during the frying process.

It is a further more object of the present invention to provide a fry apparatus that require minimal quantity of oil for frying foods, and consequently less energy consumption, less used oil for disposal, and less time for cooking.

It is a still further more object of the present invention to provide a fry apparatus that automatically separates and stirs food pieces to facilitate moisture evaporation and uniform heating.

It is yet a still further more object of the present invention to provide a fry apparatus that is of durable and reliable constructions, easily and efficiently manufactured and marketed, and at the same time economically available to the general public.

It is yet a still further more object of the present invention to provide a fry apparatus that is environment, people, and home friendly.

It is a feature of the present invention that this fry apparatus has a perforated rotary drum installed inside a container for holding and frying foods. A motor is provided to rotate this rotary drum. When the drum rotates, the food pieces therein are automatically separated and stirred.

It is another feature of the present invention that the rotary drum is partially immersed in the boiling oil, thereby reducing the requirement on the quantity of oil for frying foods, and consequently less energy consumption and less used oil for disposal.

It is a further more feature of the present invention that this fry apparatus has a container having a semi-cylindrical bottom generally following the profile of the rotary drum, thereby further reducing the requirement on the quantity of oil for frying foods.

It is a still further more feature of the present invention that this fry apparatus fries foods in a programmed automatic manner; therefore, minimal human involvement or chore is rendered.

It is yet a still further more feature of the present invention that this fry apparatus has a blowing device to force fresh air into the fry apparatus for facilitating moisture removal inside the apparatus and in the surfaces of food pieces and a venting device for removing the oil vapor content in the grease-laden air generated during the frying process before the air is exhausted into the room.

It is an advantage of the present invention that this fry apparatus is virtually hand-free for frying foods.

It is another advantage of the present invention that this fry apparatus can be easily adapted for either stove heating or electric heating, thereby giving consumers more options of use.

It is a further more advantage of the present invention that this fry apparatus is environment, people, and home friendly.

It is a still further more advantage of the present invention that this fry apparatus is easy to operate, cheap to manufacture, and providing large value to businesses and general public.

Further more features and advantages of the present invention will be readily appreciated, as the same becomes better understood after reading the subsequent description when considered in connection with the accompanying drawings.

DETAILED DESCRIPTION

Figure 1:
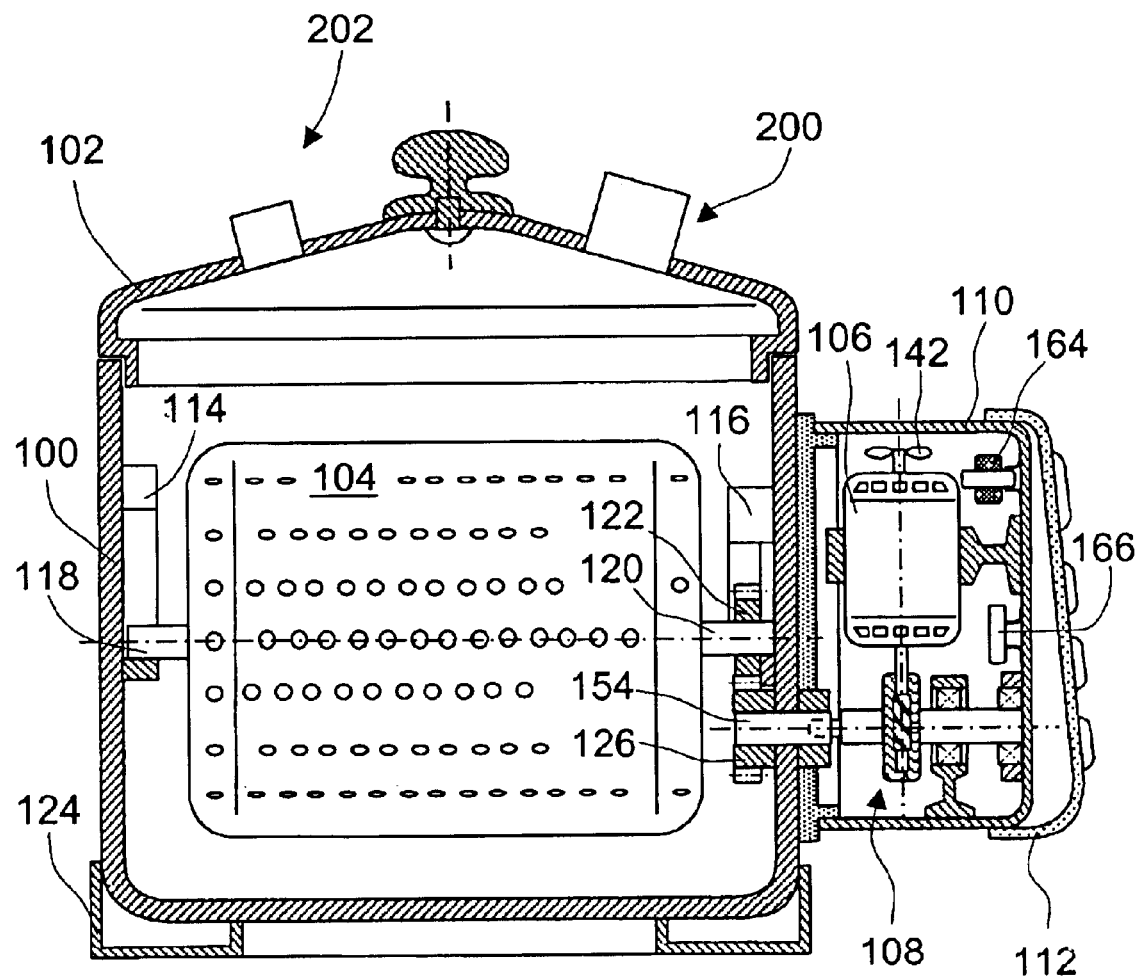
FIG. 1 illustrates a cross-sectional view of an embodiment of the present invention.

Reference is made to FIG. 1, which illustrates a cross-sectional view of an embodiment of the present invention. This fry apparatus comprises a container 100, a lid 102, a perforated rotary drum 104, a drive motor 106, a transmission assembly 108, a blowing device 200, a venting device 202, a motor housing 110, and a control panel 112.

Container 100, having an open top and a closed bottom, is used for holding and heating frying oil. Lid 702 is for covering container 100. Container 100 is, preferably, coated with a non-stick material. An observation window (not shown), made of a transparent material, can be provided on lid 102 for the frying process observation by the user.

Drum shaft guides 114 and 116 are firmly mounted inside container 100, on the sidewalls, on opposite sides, respectively, for removably installing drum 104 thereon.

Figure 2:
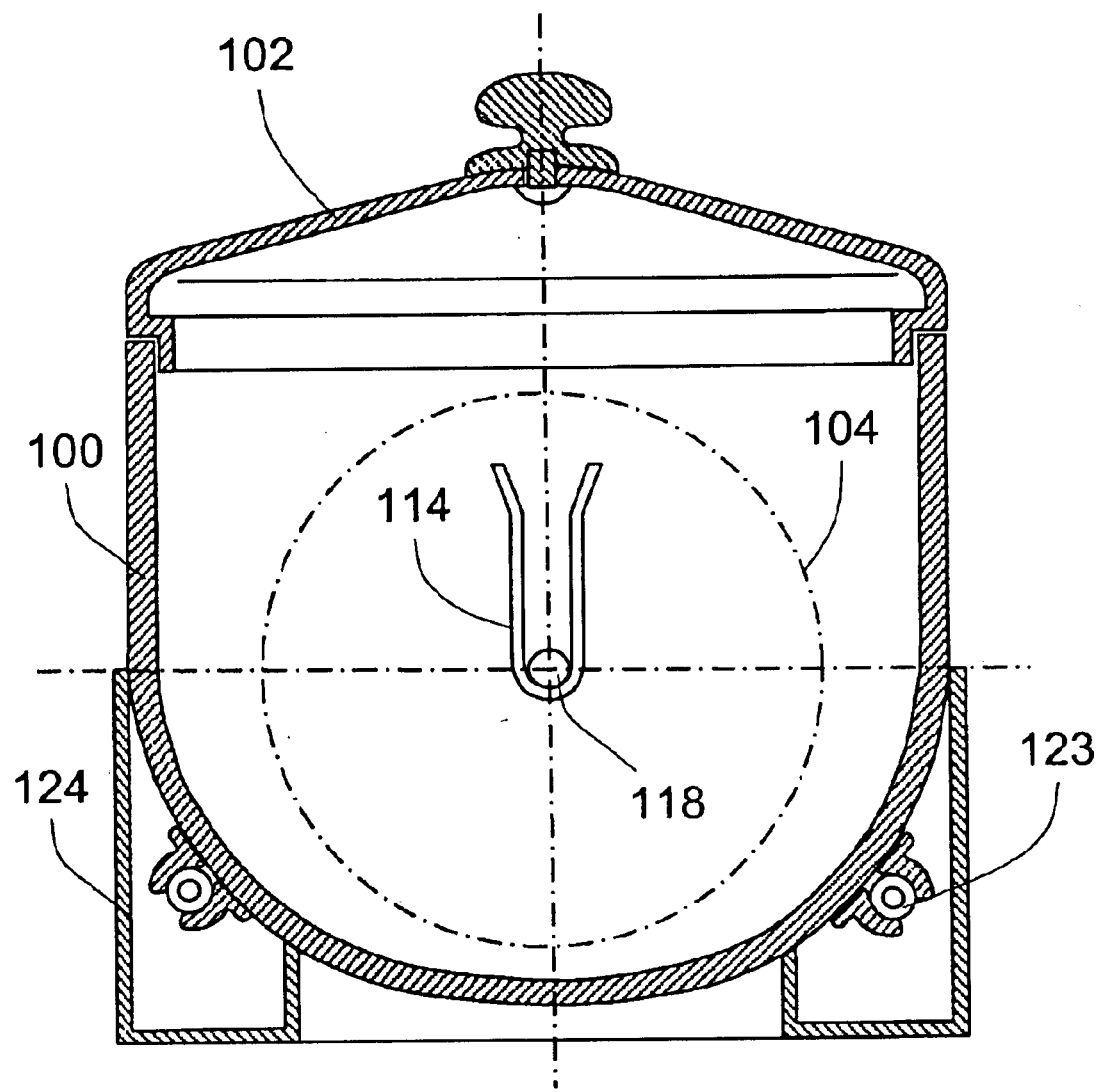
FIG. 2 illustrates a cross-sectional view of the embodiment of the present invention in FIG. 1, viewing toward drum shaft guide 114.

FIG. 2 illustrates a cross-sectional view of the fry apparatus viewing toward guide 114. Guide 114 is for guiding and supporting a drum shaft 118, which is installed on one side of drum 104. The upper portion of guide 114 opens wider for conveniently receiving shaft 118. Shaft 118 rests on the lower portion of guide 114, which forms a semi-cylindrical bottom. Shaft 118 is co-axial to the semi-cylindrical bottom of guide 114.

Figure 3:
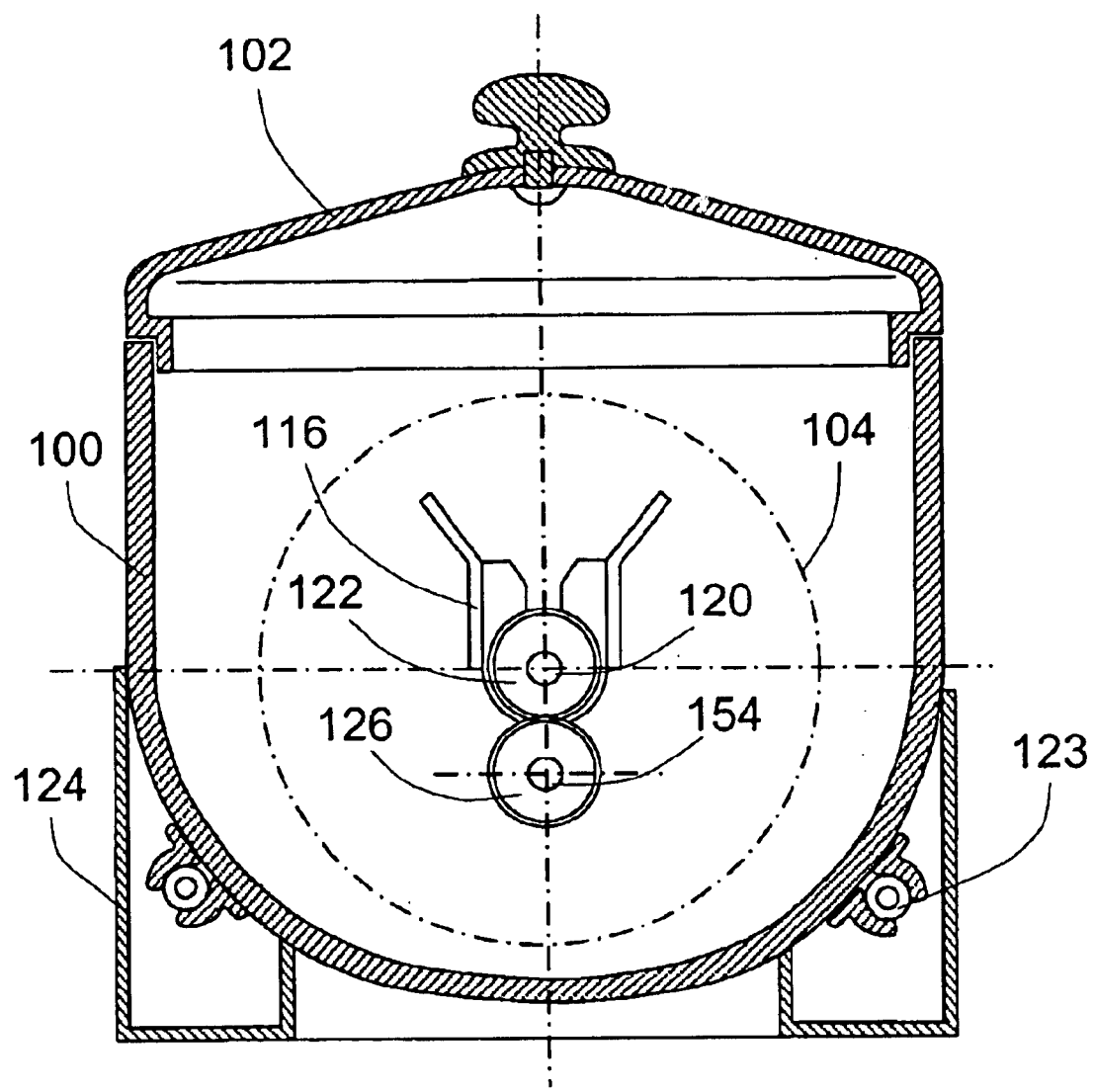
FIG. 3 illustrates a cross-sectional view of the embodiment of the present invention in FIG. 1, viewing toward drum shaft guide 116.

FIG. 3 illustrates a cross-sectional view of the fry apparatus viewing toward guide 116. Guide 116 is for guiding and supporting another drum shaft 120, which is installed on the other side of drum 104. The upper portion of guide 116 opens wider for conveniently receiving a drum gear 122, which is installed on shaft 120, and shaft 120. Shaft 120 rests on the lower portion of guide 116, which forms a semi-cylindrical bottom. Shaft 120 is co-axial to the semi-cylindrical bottom of guide 116.

A heating element 123 is provided for an electric heating fry apparatus of the present invention, as shown in FIG. 2 and FIG. 3. Heating element 123 is, preferably, fixedly installed on the sides of the semi-cylindrical portion of container 100. Heating element 123 is in a heat-transferable condition, e.g. in physical contact with the lower portion of container 100, such that when heating element 123 heats up upon connection with an electricity source, the frying oil inside container 100 will also heat up. Heating element 123 can be electrical resistance type heaters or many other types, such as high-intensity infrared lamps (not shown).

Figure 4:
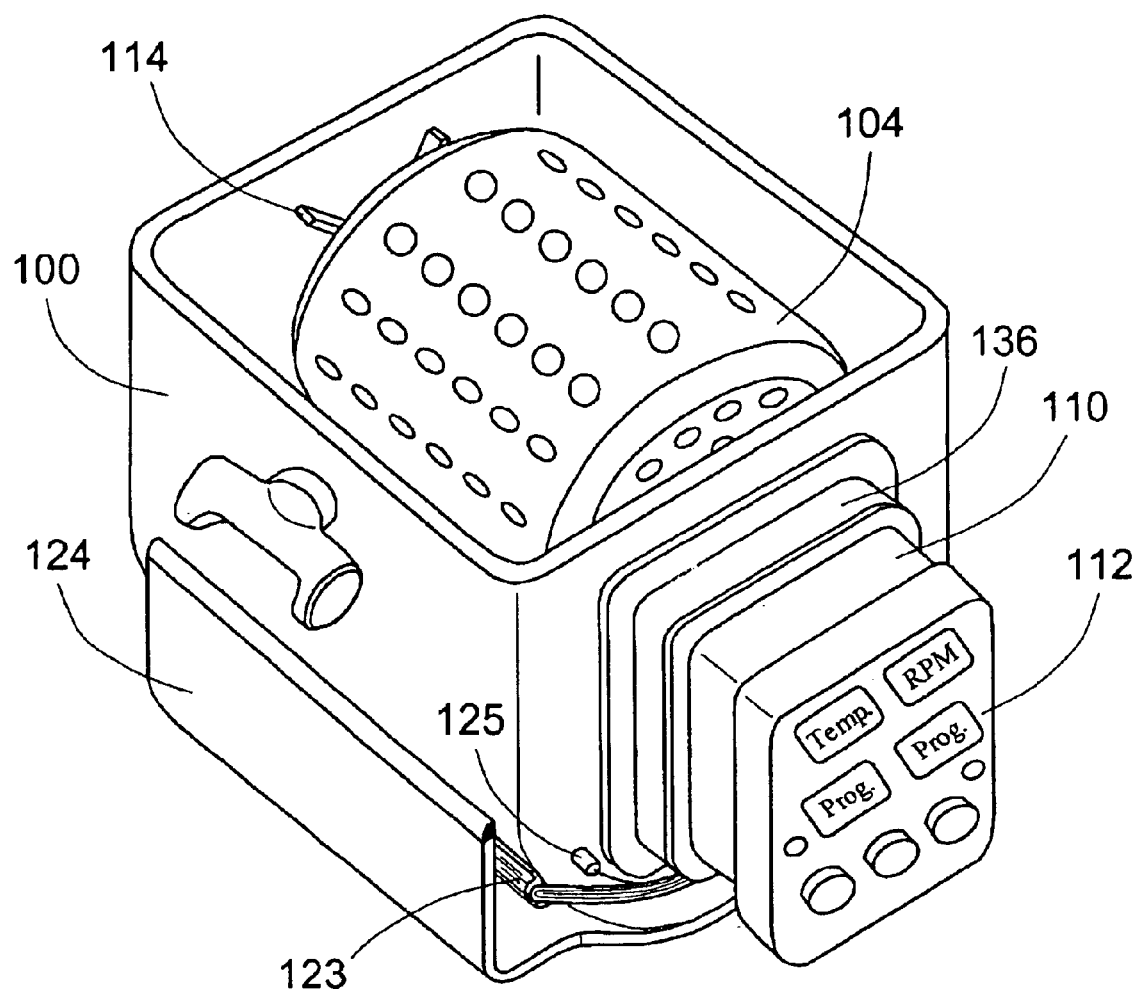
FIG. 4 illustrates a perspective view of the embodiment of the present invention in FIG. 1, but indicating additional details revealed by removal of lid 102.

FIG. 4 illustrates a perspective view of the fry apparatus of the present invention, indicating additional details revealed by removal of lid 102. The upper portion of container 100 generally forms the shape of a box, square or rectangular. The lower portion of container 100 generally forms a semi-cylindrical bottom. The bottom of container 100 generally follows the profile of drum 104 with a predetermined clearance. Reference is made to FIG. 2 and FIG. 3 for a better view of the relative position of drum 104 to container 100. Basically, the smaller the clearance between drum 104 and container 100, the less quantity of frying oil is required for frying foods. An adapting member 124 is provided affixed on the bottom of container 100 for providing a bottom support for the fry apparatus, such that the fry apparatus can stand on a flat surface or a stove top for heating.

A temperature sensor 125 is provided for measuring the temperature of the frying oil, as an input variable to be controlled. Sensor 125 is installed on the bottom portion of container 100. When the temperature of the frying oil is above the user's desired one, the electrical power to heating element 123 will be shut down to better meet the user's desired frying requirement and to save energy.

Reference is, again, made to FIG. 1. Drum 104, made of perforated metal sheets, is for holding and frying foods and is removably installed inside container 100 about a horizontal axis, defined by guides 114 and 116. The perforations are smaller than the food pieces to be fried. Drum 104 is, preferably, coated with a non-stick material.

Shafts 118 and 120 are installed on the centers of two sides of drum 104, respectively, for operationally supporting drum 104. Both shafts 118 and 120 are co-axial to drum 104. Shaft 118 is guided and supported by guide 114. Shaft 120 is guided and supported by guide 116. Drum gear 122 is installed on shaft 120 and operationally rests on a drive gear 126, which is operationally driven by motor 106. The engagement between gears 122 and 126 is assured by the gravity of drum 104 and the food therein. At an operation position, only the lower portion of drum 104 is immersed in the frying oil. The oil level can be adjusted for various frying requirements or methods.

The engagement of gears 122 and 126 can take some other forms, such as, instead of a pair of gearing wheels, the power transferring can, alternatively, be achieved by means of a pair of high-friction wheels.

Figure 5:
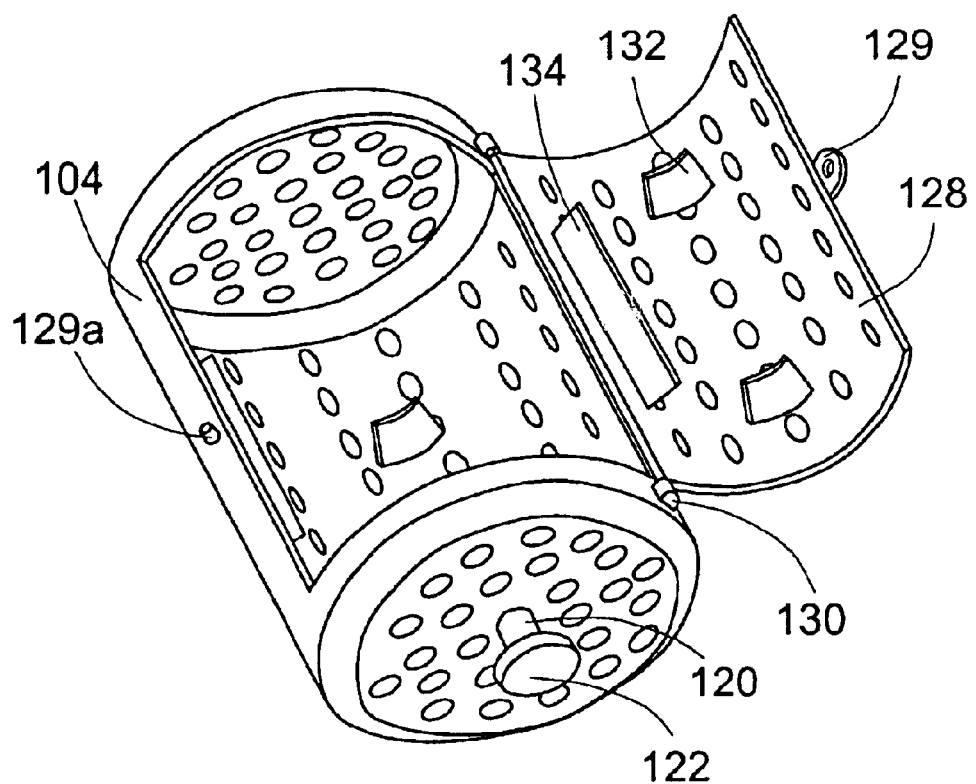
FIG. 5 illustrates a perspective view of drum 104.
Figure 6:
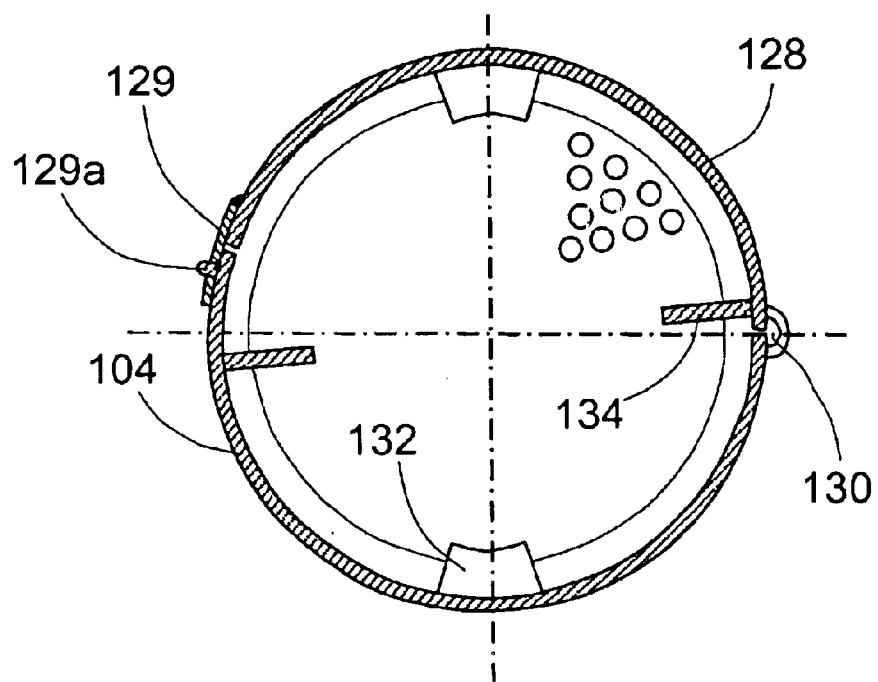
FIG. 6 illustrates a cross-sectional view of drum 104.

Reference is, now, made to FIG. 5 and FIG. 6. FIG. 5 illustrates a perspective view of drum 104 and FIG. 6 illustrates a cross-sectional view of drum 104. An opening door 128 is provided thereon for loading raw foods and unloading finished foods. Door 128 is installed on the main body of drum 104 through a pair of hinges, generally designated as 130. Hinges 130 allow door 128 to be pivotally opened and closed on drum 104. The size of door 128 is substantially half of the cylindrical sidewall of drum 104 for the convenience of loading raw foods and unloading finished foods. Door 128 can be locked in its closed position in any suitable manner, such as by a clasp 129 mounted on door 128 and a projection 129a mounted on the main body of drum 104 for lockably receiving clasp 129.

An observation window (not shown), made of a transparent material, can be provided on drum 104 for facilitating the observation of the frying process.

The speed, at which drum 104 is rotated, is important. For too low speeds, the food pieces cannot be agitated enough to achieve the desired effect of homogeneous heating and the evaporation of food moisture. If the speed is too high, the food pieces are agitated too much, such that the crispy surfaces of food pieces are damaged, which, in turns, causes frying oil to be wasted due to too much tiny food particles in the oil. Preferably, drum 104 is rotated at a speed of about 0.5 to 10 rpm during the frying process. Particularly, good results have been achieved when drum 104 is rotated at 6 rpm.

In reality, different stages of a frying process require different rotation speeds. For example, at the very beginning, the speed is, preferably, low for the food pieces to form initial crispy surfaces. After the initial crispy surfaces are formed and large lumped-together food pieces are separated, the speed is, preferably, to increase steadily to a predetermined ideal speed. The control of the speed can be achieved in a programmed automatic manner.

A plurality of separating blades, generally designated as 132, is provided inside drum 104, installed on the cylindrical sidewall, for separating the initially lumped-together food pieces, such as raw meat pieces mixed with starch and seasoning ingredients, etc. Blades 132 are generally perpendicular to the central axis of drum 104 and parallel to the two sides of drum 104. This separating operation facilitates the heat transfer for a homogeneous heating of the food and facilitates the evaporation of the moisture residing in the surfaces of food pieces.

A plurality of paddle blades, generally designated as 134, is provided inside drum 104, installed on the cylindrical sidewall, for preventing the food from sliding therealong as drum 104 rotates. Blades 134 are generally parallel to the central axis and extend longitudinally on the cylindrical sidewall of drum 104. In operation, blades 134 take the food rotating with them at the bottom and then tumble the food into the frying oil when the food reaches a certain height. This agitating operation facilitates the heat transfer for a homogeneous heating of the food and facilitates the evaporation of the moisture residing in the surfaces of food pieces.

Figure 7:
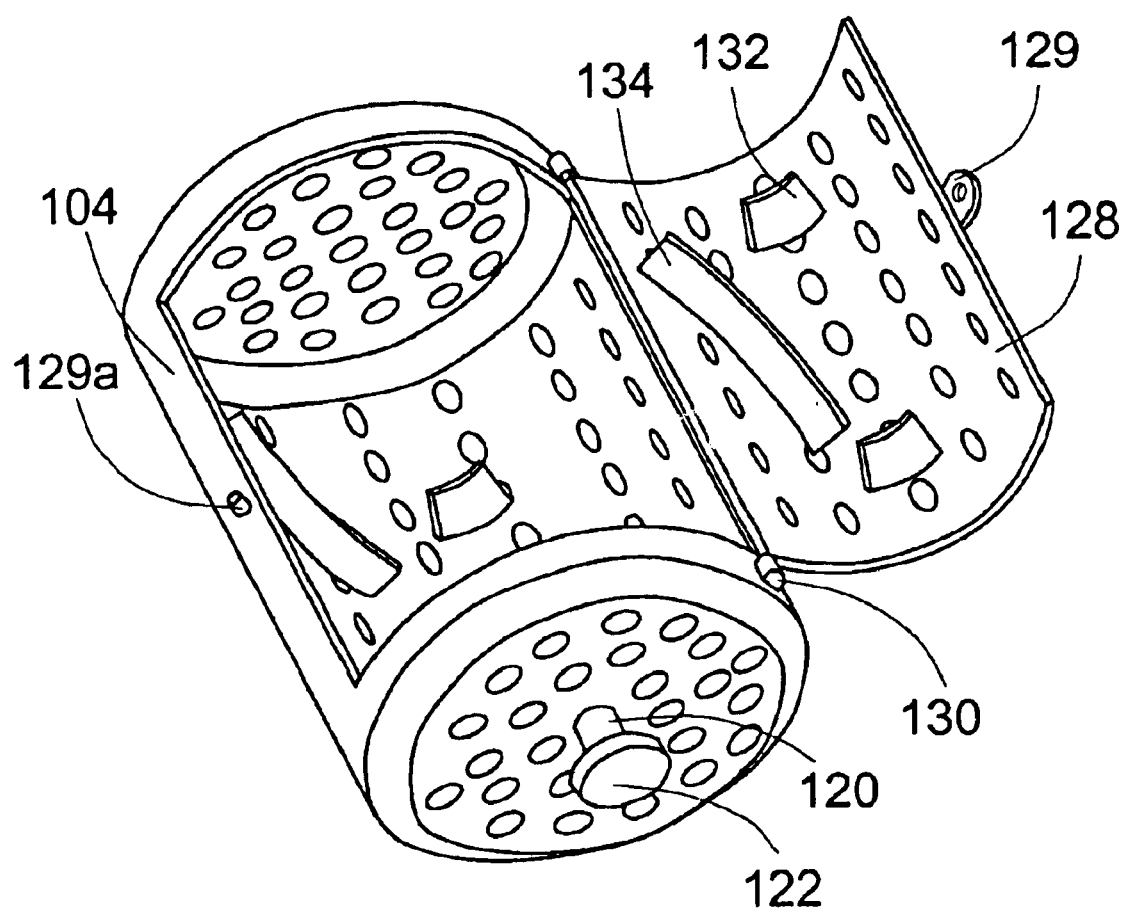
FIG. 7 illustrates a perspective view of drum 104 with an alternative helical design of paddle blades 134.

Blades 134 can, alternatively, take some other shapes, such as a helical design, as shown in FIG. 7, for better agitating the food during the frying process while drum 104 rotates.

Equivalent constructions of blades 134 can, also, be made of protrusions inside drum 104 formed on the cylindrical sidewall.

Figure 8:
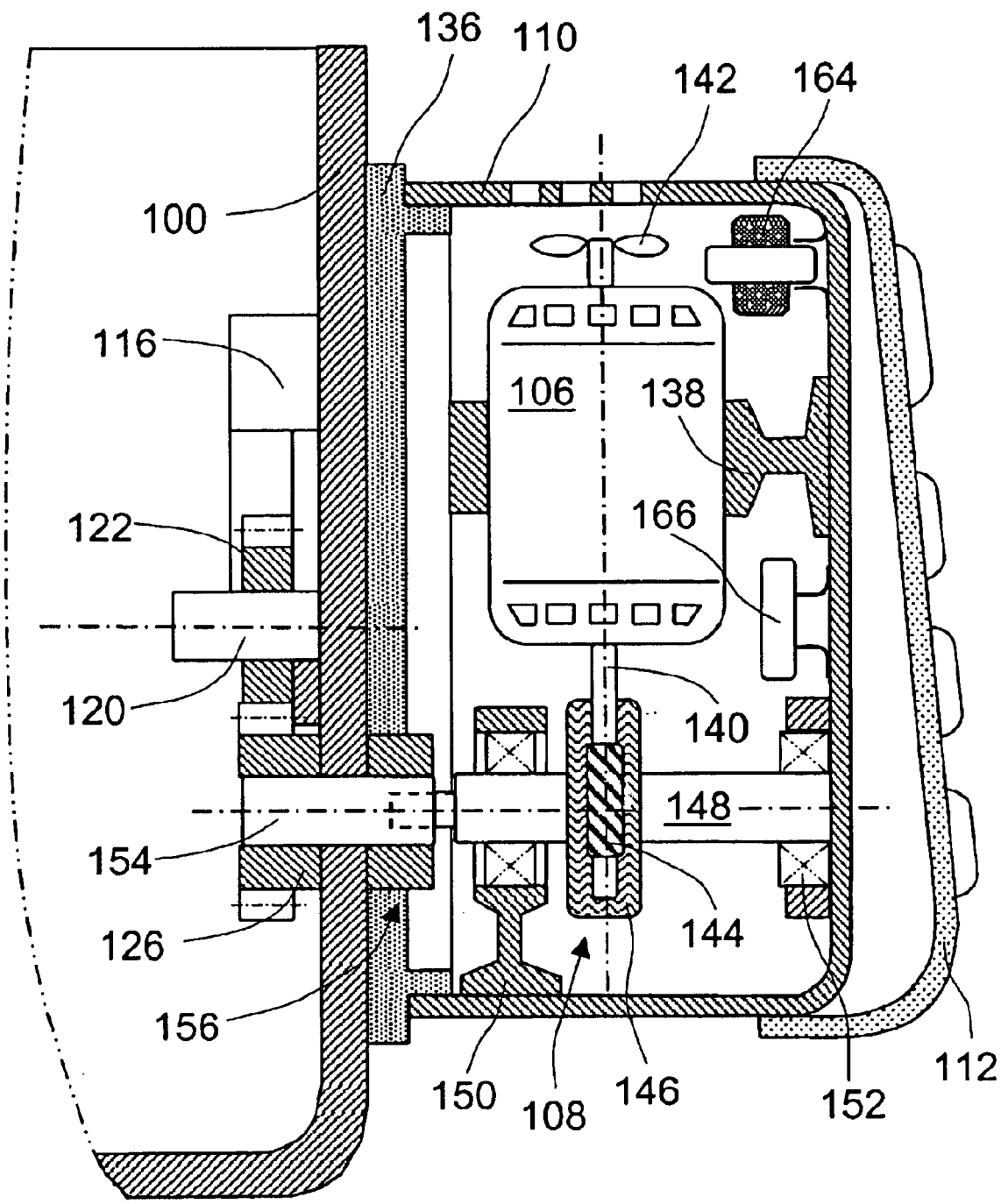
FIG. 8 illustrates an exploded cross-sectional view of transmission assembly 108.

FIG. 8 illustrates an exploded cross-sectional view of motor housing 110, motor 106, and transmission assembly 108.

Motor housing 110 is removably installed on the sidewall of container 100 through an adapting bracket 136. Bracket 136 is installed on the sidewall of container 100 for lockably receiving motor housing 110. Bracket 136 is, preferably, made of a heat resistant material.

Motor 106 is installed on motor housing 110 through a bracket 138. The first end of a motor shaft 140 leads to transmission assembly 108. A fan 742 is fixed to the second end of motor shaft 740for circulating the air inside motor housing 110 to maintain the temperature, therein, low. Motor 106 is operationally connected to a DC adapter 164.

A worm rod 144 is installed on the first end of motor shaft 140. A worm wheel 146, which is installed on and supported by a main shaft 148, is engaged with worm rod 144 for transferring power from motor 106 to main shaft 148.

There are many reasons why a worm gearing design is used therein. Worm gearing, properly designed and produced, provides a good trouble-free drive for smooth operation and permits a wide selection of ratios. The primary benefit is that a worm gearing requires a small space.

The selection of materials is critical. SAE 65 bronze with about 1% nickel is good for worm wheel 146. Worm rod 144 should be hardened steel with the threads ground after hardening.

Main shaft 148 is installed on motor housing 110 through a bracket 150 and a plurality of bearing elements, generally designated as 152. The drive end of main shaft 148 forms a square head or gear head leading to a drive shaft 154.

Figure 9:
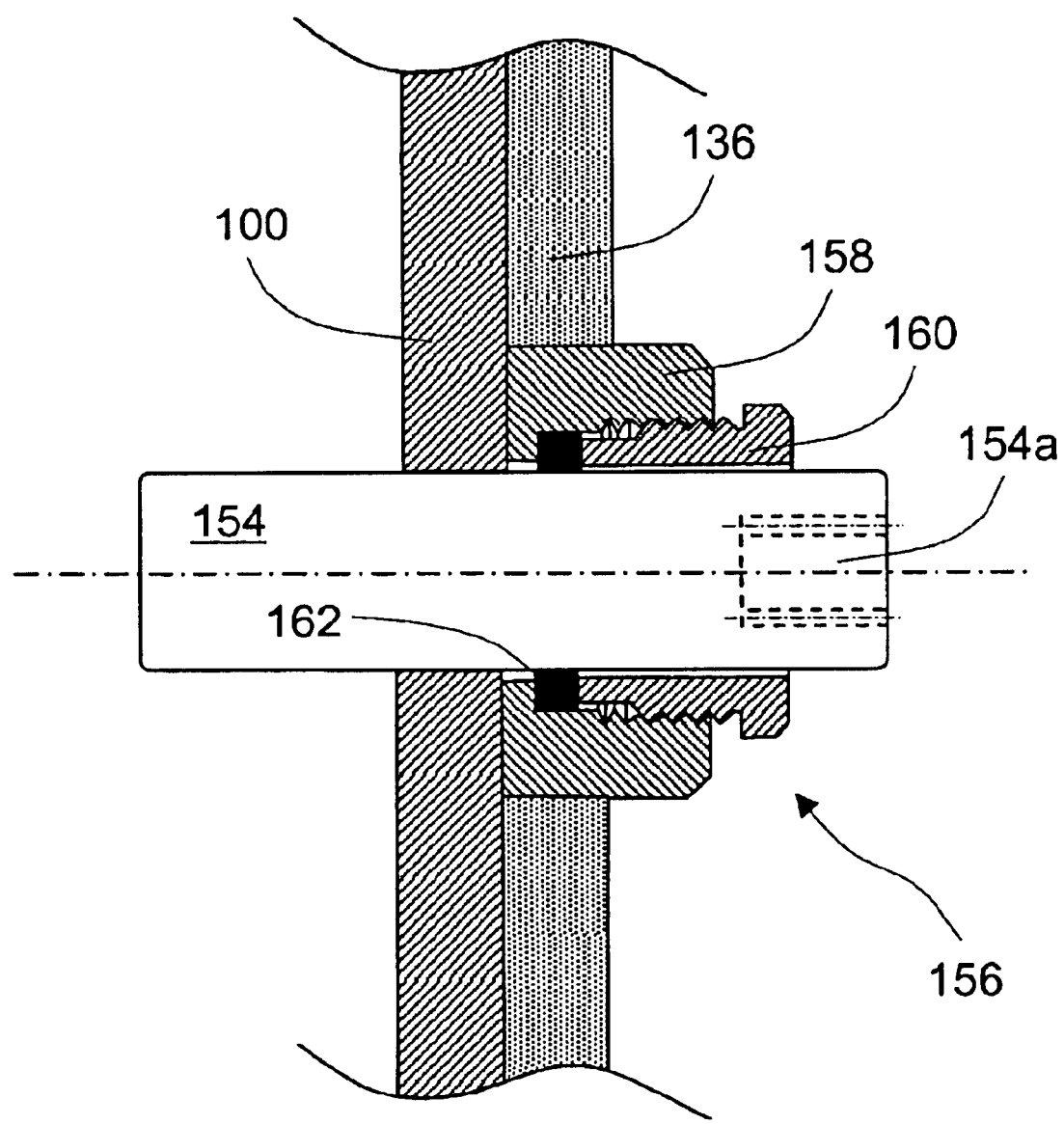
FIG. 9 illustrates an exploded cross-sectional view of seal assembly 156 in FIG. 8.

The first end of drive shaft 154 has an inner gear 154a, as more clearly shown in FIG. 9, for removably receiving the drive end of main shaft 148, such that this end loosely or removably engages with the square head of main shaft 148. This kind of coupling dramatically reduces the co-axial requirement on main shaft 148 and drive shaft 154 and facilitates the assembly process for manufacturing. The second end of drive shaft 154 extends through the sidewall of container 100.

Drive gear 126 is installed inside container 100 on the second end of drive shaft 154. Drum gear 122, engaged with drive gear 126, rests on drive gear 126 and the engagement is secured or facilitated by the gravity of drum 104 and the food therein. This wheeled drive design eliminates the possibility of overloading of motor 106 and transmission 108, due to some accidental events such that drum 104 is mechanically stopped inside container 100.

A seal assembly 156 is provided for sealing between shaft 154 and container 100. FIG. 9 illustrates an exploded cross-sectional view of seal assembly 156. Seal assembly 156 comprises a sleeve 158, a gland nut 160, and a compression packing 162.

Sleeve 158 is co-axial to drive shaft 154. The first end of sleeve 158 is sealingly installed on the outside of the sidewall of container 100. Gland nut 160 is engaged with the second end of sleeve 158 by means of screw. Packing 162 creates a seal by being squeezed between the throat of the stuffing box formed by sleeve 158 and gland nut 160. The squeeze force pushes the material against the throat of the box and the rotating shaft 154. When the leakage occurs, the gland nut 160 is tightened further. This is a typical application of compression packings for low speed rotating shafts.

Materials are extremely important when selecting the proper packing for an application. Metallic packings are used in high-temperature applications. Shafts for copper and aluminum packings must be hardened to 500 Brinell hardness number (Bhn). Copper and aluminum packings can handle 538° C. (1000° F.) application temperature.

Seal assembly 156 can, alternatively, take other forms, such as bushing and labyrinth seals, or combinations of multiple forms for ideal performance.

Figure 10:
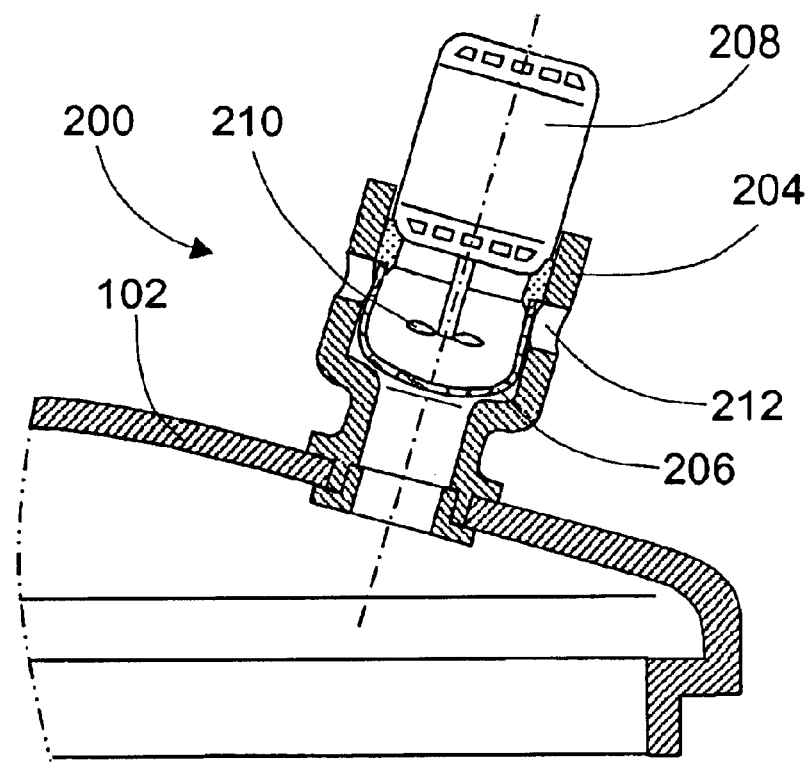
FIG. 10 illustrates an exploded cross-sectional view of blowing device 200.
Figure 11:
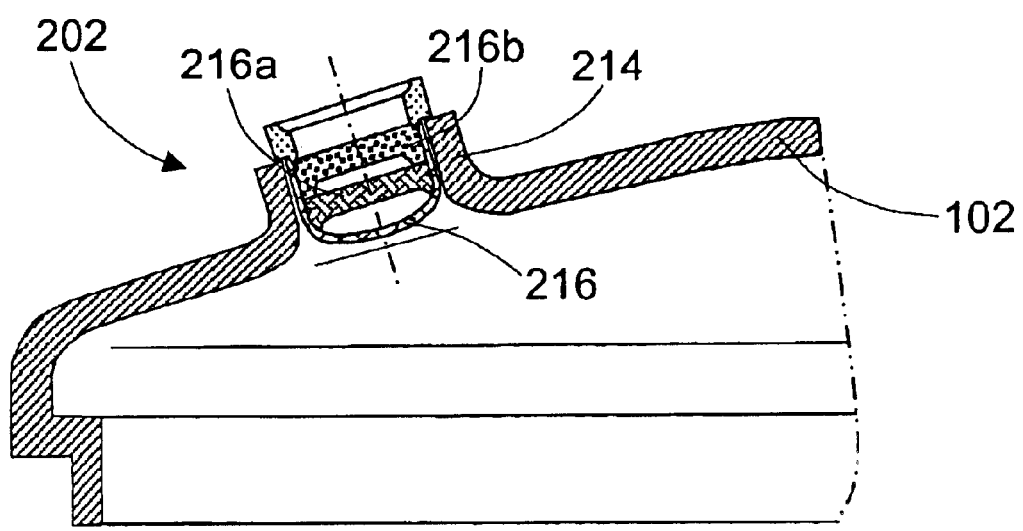
FIG. 11 illustrates an exploded cross-sectional view of venting device 202.

Reference is, now, made to FIG. 10 and FIG. 11, which illustrate an embodiment of a forced venting system, which includes a blowing device 200 and a venting device 202.

Blowing device 200 includes an in-take conduit 204, an in-take filter 206, a blowing motor 208, and a fan 210.

The first end of in-take conduit 204 is mounted on lid 102. There is an opening on lid 102 inline with in-take conduit 204 for allowing fresh air to be forced into the fry apparatus. There are apertures, generally designated as 212, on in-take conduit 204, close to the second end of in-take conduit 204. Apertures 212 function as an air inlet. In-take conduit 204 also serves as a bracket for holding in-take filter 206 and motor 208. In-take filter 206 is removably engaged with the second end of in-take conduit 204. Motor 208 is removably coupled with in-take filter 206. Fan 210 is connected to motor 208 on the shaft and inserted in in-take filter 206. Motor 208 is operationally connected to adapter 164, which is shown in FIG. 8.

In-take filter 206 primarily functions as a shield for fan 210 and motor 208 against the splattering of grease and food particles and is typically made of one or multiple layers of meshes, preferably metal ones, such as aluminum meshes. A predetermined strength is desired because In-take filter 206 is also used as a protection shield to fan 210 for avoiding potential injuries to the people.

Venting device 202 includes a venting conduit 214 and a venting filter 216.

The first end of venting conduit 214 is mounted on lid 102. There is an opening on lid 102 inline with venting conduit 214 for allowing cooking fumes to be forced out therethrough. Venting conduit 214 also serves as a bracket for holding venting filter 216. Venting filter 216 is removably engaged with the second end of venting conduit 214. Venting filter 216 further includes a disposable paper or fabric filter 216a and/or a disposable activated charcoal filter 216b, together, as an integrated filter.

Venting filter 216 is provided to condense the moisture content and trap the grease impurities in the moisture-laden and grease-laden air forced out from the fry apparatus by fan 210. Venting filter 216 is, preferably, made of one or multiple layers of metal meshes, such as aluminum ones. Metal meshes have different sizes of meshes and overlap each other. When the cooking fumes pass through, the moisture and the oil particles will be distilled or trapped thereon. Filters 216a and 216b are provided for further removing the remaining oil vapor and chemical contents in the cooking fumes and for removing the cooking fume odors before the air is exhausted into the room.

Figure 12:
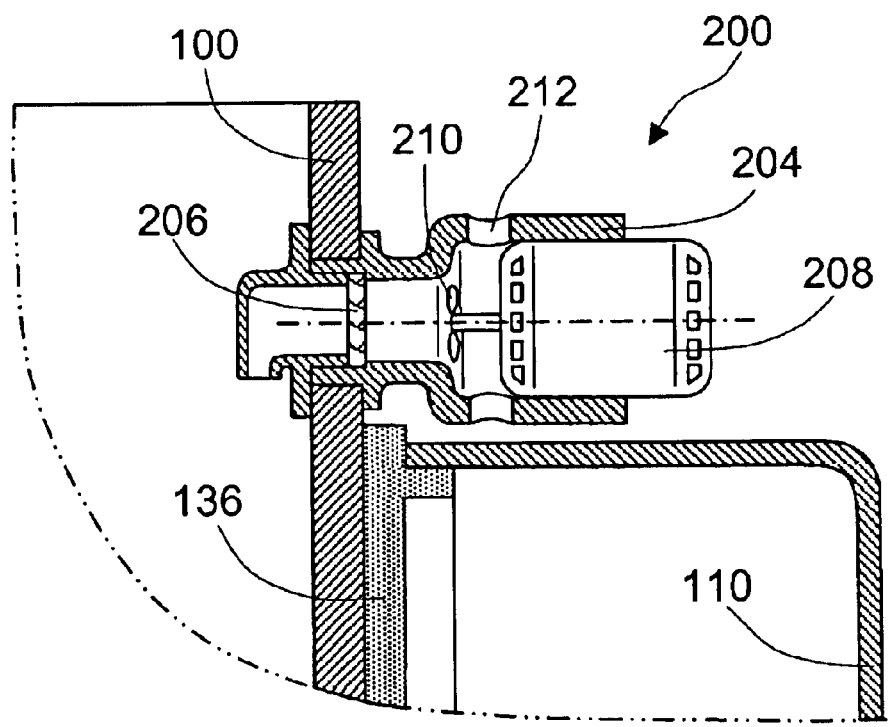
FIG. 12 illustrates an exploded cross-sectional view of an alternative installation of blowing device 200.

Reference is made to FIG. 12, which illustrates another embodiment of the installation of blowing device 200 on the fry apparatus of the present invention.

Blowing device 200 is, alternatively, mounted on the upper portion of the sidewall of container 100. The first end of in-take conduit 204 is mounted on the upper portion of the sidewall of container 100. There is an opening thereon inline with in-take conduit 204 for allowing fresh air to be forced into the fry apparatus. Other features are the same as what have been discussed previously.

Figure 13:
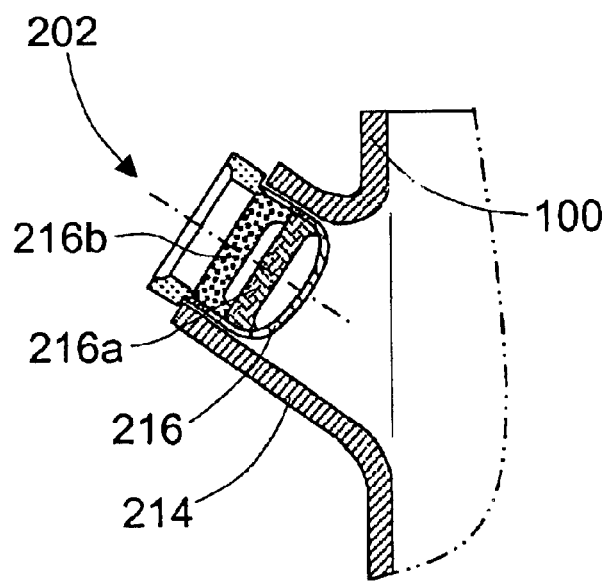
FIG. 13 illustrates an exploded cross-sectional view of an alternative installation of venting device 202.

Reference is made to FIG. 13, which illustrates another embodiment of the installation of venting device 202 on the fry apparatus of the present invention.

Venting device 202 is, alternatively, mounted on the upper portion of the sidewall of container 100. The first end of venting conduit 214 is mounted on the upper portion of the sidewall of container 100. There is an opening thereon inline with venting conduit 214 for allowing filtered air to be forced out of the fry apparatus. Other features are the same as what have been discussed previously.

Reference is made to FIG. 8, again. DC adapter 164 is provided inside motor housing 110 for providing electricity power to elements, like indicators, beepers, LCD, etc., and to motors 106 and 208, as well. Also included therein is a control module 166 for controlling the frying apparatus of the present invention, such as the oil temperature for frying foods, motor speeds for rotating drum 104, and the speed at which blowing motor 208 is rotating.

Figure 14:
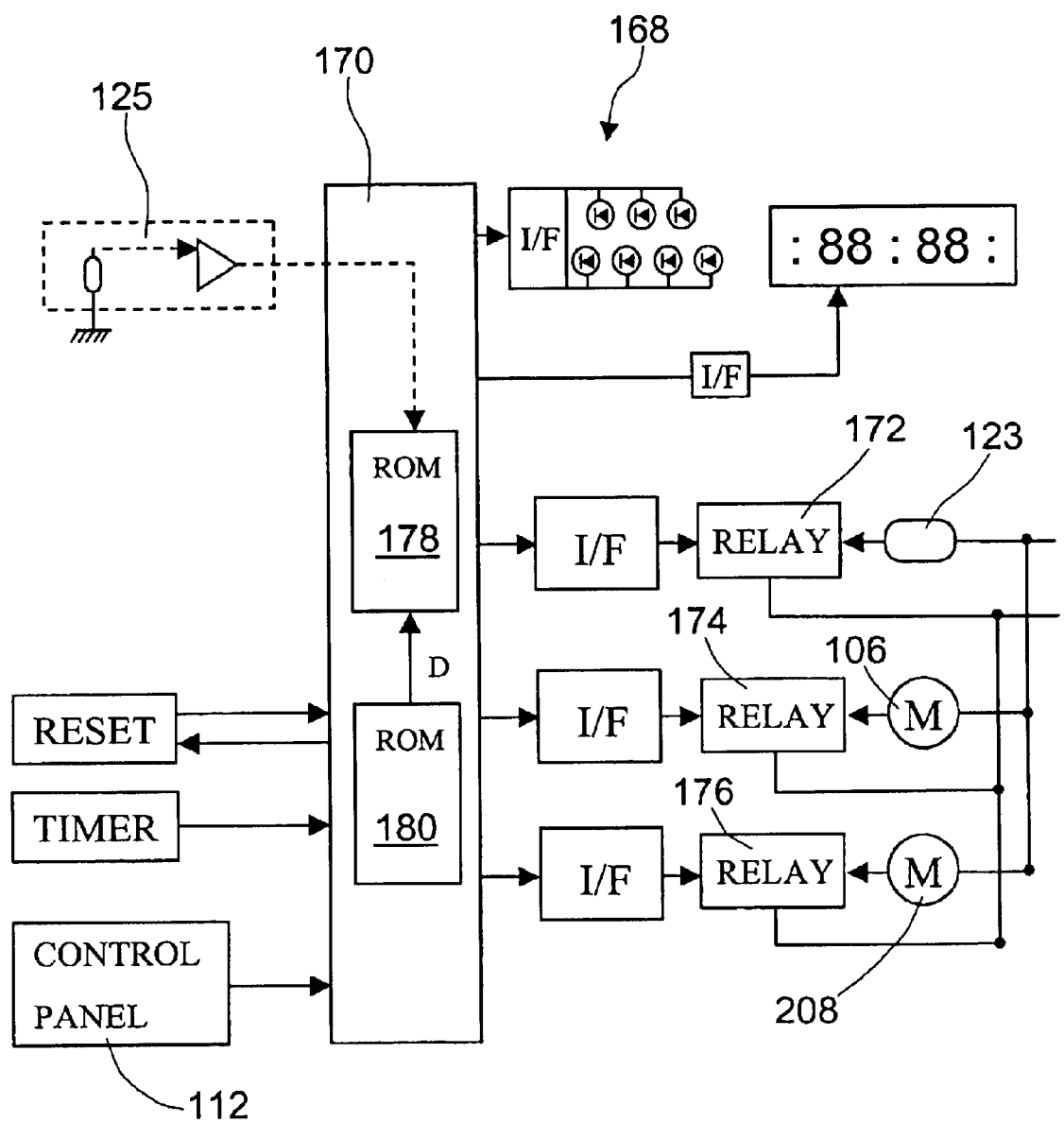
FIG. 14 illustrates a blocked diagram of control circuit 768 for the fry apparatus of the present invention.

Control module 166 includes a circuit 168, as the blocked construction diagram shown in FIG. 14. Circuit 168 comprises a microcomputer 170, which controls the frying apparatus, a relay 172, which activates heating element 123, a relay 174, which activates motor 106, and a relay 176, which activates motor 208.

Microcomputer 170 is provided with ROM and RAM for data memory, and further provided with I/O ports A/D converters as interfaces. The aforementioned ROM's comprises a ROM 178 containing control programs related to the performance of all frying processes and a ROM 180, which memorizes referenced data.

Control panel 112, removably attached on motor housing 110, is provided for supporting elements, like switches, indicators, adjusting knobs, beepers, LCD, and so on.

In operation, a user:

First, charges container 100 with oil, and then loads drum 704 with the food to be fried.

Second, preheats the oil to a predetermined temperature, preferably, halfway boiling. This step can be one step of a cooking program.

Third, installs drum 104 inside container 100 and covers lid 102 on the top of container 100.

Fourth, selects an oil temperature, a time duration, a drum rotation speed, and a blowing motor speed, or a program for frying foods, and then pushes on start button for activating the frying process.

The whole frying process is hand-free. The user does not have to be involved with the frying process until the frying is done. The frying apparatus will beep to remind the user that the frying process is done.

Figure 15:
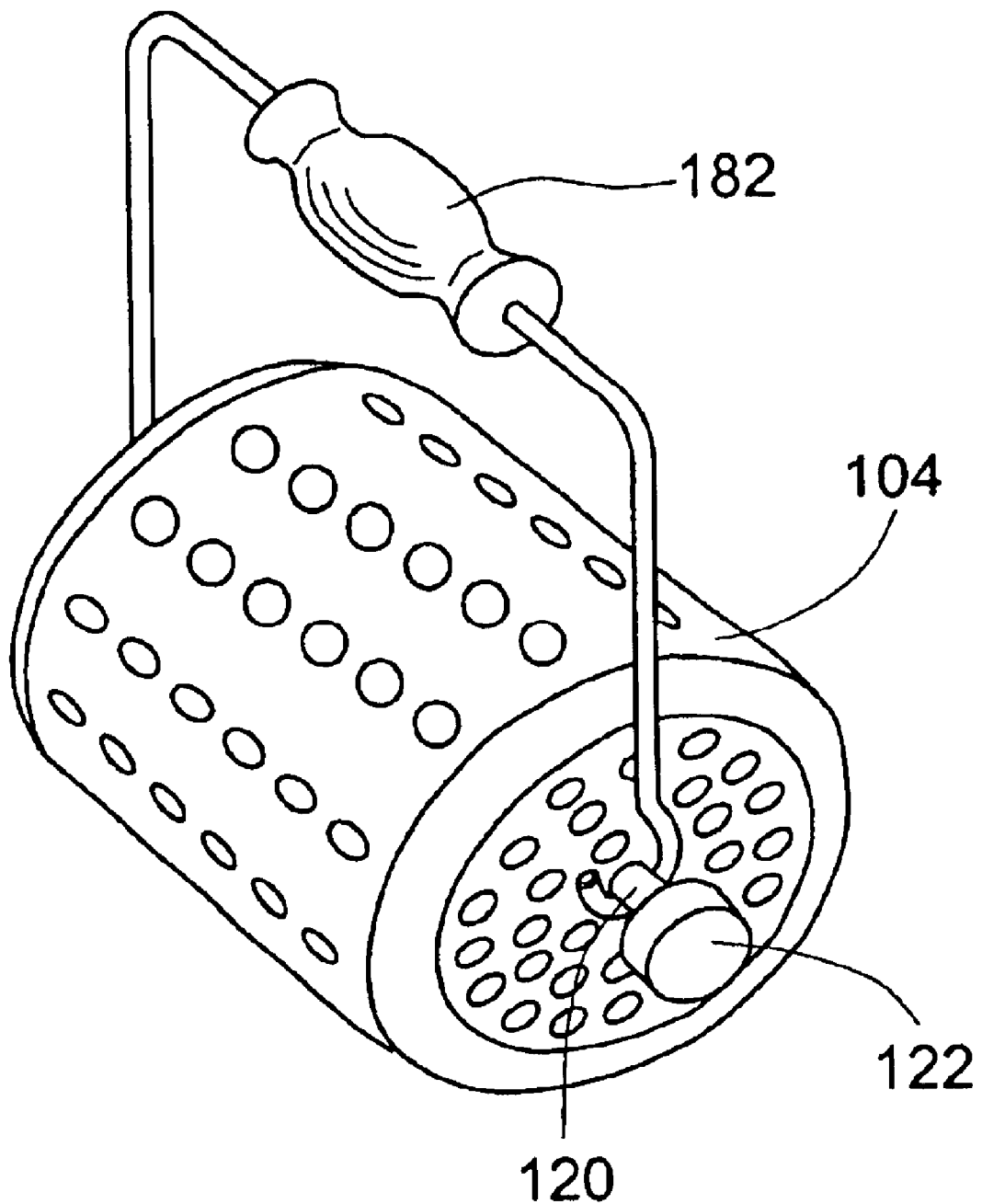
FIG. 15 illustrates a perspective view of drum handle 182 in handling drum 104.

Then drum 104 can be taken out using a drum handle 182, as shown in FIG. 15. Drum handle 182 is an auxiliary part, which is used for installing drum 104 in position and for taking drum 104 out when the frying is accomplished. The fried food is, now, ready for serving.

Accordingly, readers will see that this fry apparatus of the present invention can be used to prepare tasteful fried foods. This fry apparatus has a rotary drum, which tumble the food into frying oil periodically to achieve a homogeneous heating. During the time the food pieces are lifted out of oil, the surface moisture is facilitated to evaporate by a blowing device. The frying process is fully automatic, thereby minimizing human involvement and chore of the frying process. This fry apparatus is used with the lid fully covering the container, thereby eliminating the grease splattering and the risk of oil burns to people. At the same time the grease-laden air generated during the frying process is forced through a venting device and filtered before being discharged into the room, thereby avoiding long-term hazards to the people and home environment.

The present invention has been described in an illustrative manner. It is to be understood that the terminology, which has been used, is intended to be in the nature of words of description rather than of limitation.

Although the invention has been described in its preferred forms and structures with a certain degree of particularity, these should not be construed as limiting the scope of the invention but as merely providing illustrations of some of the presently preferred embodiments of this invention.

For examples, although this invention has been described in a form of home fry apparatuses, it can have potential business use, such as use in restaurants. Therefore, this invention can alternatively be described as food processing equipment. Although this invention has been described in a form of blowing fresh air into the fry apparatus, it is understood that the rearrangement of the motor, fan, and filters, such that, instead of blowing fresh air into the fry apparatus, the fan actually draws the moisture-laden and grease-laden air out of the fry apparatus, is perfectly inline with the spirit of forced venting concept. Such rearrangement is, therefore, covered by the present invention.

Those skilled in the art can perceive improvements. For examples, obvious improvements can come with the additions of food manipulating devices and/or observation means, etc.

Thus it is understood that the present disclosure of the preferred forms can be changed in the details of construction and in the combination and arrangement of parts without departing from the spirit and the scope of the invention as hereinafter claimed.

What is claimed is:

1. A fry apparatus, said fry apparatus comprising:
    a container having a open top and a closed bottom for holding and heating oil;
    a lid covering on top of said container for closing up said open top of said container;
    a perforated rotary drum removably installed inside said container for holding and frying foods;
    at least one drum shaft guide installed inside said container for guiding and supporting said perforated rotary drum in position;
    a drive motor operationally connected to an electrical power supply for rotating said perforated rotary drum;
    a transmission assembly for operationally coupling said drive motor and said perforated rotary drum;
    a sealing assembly for sealing between a drive shaft from said transmission assembly and a shaft aperture on a side of said container; and
    a venting device for exhausting cooking fumes.

2. A fry apparatus as defined in claim 1, wherein said venting device includes:
    a venting conduit having a first end mounted on said fry apparatus and a second end; and
    filter means engaged with said second end of said venting conduit for cooking fumes treatment.

3. A fry apparatus as defined in claim 1, wherein said perforated rotary drum includes at least one paddle blade installed inside said perforated rotary drum on the cylindrical sidewall for preventing food pieces from sliding inside said perforated rotary drum and for better agitating food pieces for more homogeneous heating, as said perforated rotary drum rotates.

4. A fry apparatus as defined in claim 1, said fry apparatus further including a blowing device for forcing fresh air into said fry apparatus during frying processes.

5. A fry apparatus as defined in claim 4, wherein said blowing device includes:
   an in-take conduit having a first end mounted on said fry apparatus and a second end;
   a blowing motor engaged with said second end of said in-take conduit and operationally connected to said electrical power supply; and
   a fan connected to said blowing motor for blowing fresh air into said fry apparatus during the frying process.

6. A fry apparatus as defined in claim 5, said fry apparatus further including means for heating the frying oil disposed in said container.

7. A fry apparatus as defined in claim 6, said fry apparatus further including control means for controlling various functions of said fry apparatus, whereby the frying process can be accomplished in a programmed automatic manner for minimizing human involvement and chore in preparing fried foods.

8. A fry apparatus as defined in claim 1, wherein said venting device is installed on said lid and includes a fabric or paper filter for cooking fumes treatment.

9. A fry apparatus as defined in claim 1, wherein the upper portion of said at least one drum shaft guide opens wider for conveniently receiving a drum shaft, and wherein said drum shaft rests on the lower portion of said at least one drum shaft guide, which forms a semi-cylindrical bottom.

10. A fry apparatus as defined in claim 1, wherein said sealing assembly includes a compression-packing adapted to be squeezed against said drive shaft from said transmission assembly and said shaft aperture on the side of said container for generating a tight sealing thereof.

11. A fry apparatus as defined in claim 1, wherein said venting device includes a metal meshes filter for capturing the grease content in cooking fumes, and wherein said metal mesh filter is washable and reusable.

12. A fry apparatus as defined in claim 11, wherein said venting device includes a fabric or paper filters for capturing the grease content in cooking fumes.

13. A fry apparatus as defined in claim 1, wherein said venting device includes a fabric or paper filter for capturing the grease content in cooking fumes.

14. A fry apparatus as claim 1, wherein said venting device includes an activated carbon filter for capturing the grease content and removing cooking odors in cooking fumes.

15. A fry apparatus, said fry apparatus comprising:
   a container having a open top and a closed bottom for holding oil;
   a lid covering on top of said container for closing up said open top of said container;
   a perforated rotary drum removably installed inside said container for holding foods;
   at least one drum shaft guide installed inside said container for guiding and supporting said perforated rotary drum in position;
   heating means for heating foods;
   a drive motor operationally connected to an electrical power supply for rotating said perforated rotary drum;
   a transmission assembly for operationally coupling said drive motor and said perforated rotary drum; and
   a sealing assembly for sealing between a drive shaft from said transmission assembly and a shaft aperture on the side of said container.

16. A fry apparatus as defined in claim 15, wherein the upper portion of said at least one drum shaft guide opens wider for conveniently receiving a drum shaft, and wherein said drum shaft rests on the lower portion of said at least one drum shaft guide, which forms a semi-cylindrical bottom.

17. A fry apparatus as defined in claim 15, wherein said perforated rotary drum includes at least one paddle blade installed inside said perforated rotary drum on the cylindrical sidewall for preventing food pieces from sliding inside said perforated rotary drum and for better agitating food pieces for more homogeneous heating, as said perforated rotary drum rotates.

18. A fry apparatus as defined in claim 15, wherein said sealing assembly includes a compression-packing adapted to be squeezed against said drive shaft from said transmission assembly and said shaft aperture on the side of said container for generating a tight sealing thereof.

19. A fry apparatus as defined in claim 15, said fry apparatus further including control means for controlling various functions of said fry apparatus, whereby the frying process can be accomplished in a programmed automatic manner for minimizing human involvement and chore in preparing fried foods.

* * * * *